United States Patent
Schober et al.

(10) Patent No.: US 12,279,272 B2
(45) Date of Patent: Apr. 15, 2025

(54) PDCCH MONITORING IN UNLICENSED SPECTRUM FOR A TERMINAL DEVICE WITH A SINGLE ACTIVE PANEL

(71) Applicant: NOKIA TECHNOLOGIES OY, Espoo (FI)

(72) Inventors: Karol Schober, Helsinki (FI); Kari Juhani Hooli, Oulu (FI); Esa Tapani Tiirola, Oulu (FI); Claudio Rosa, Randers NV (DK); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 332 days.

(21) Appl. No.: 17/755,252

(22) PCT Filed: Oct. 25, 2019

(86) PCT No.: PCT/EP2019/079268
§ 371 (c)(1),
(2) Date: Apr. 25, 2022

(87) PCT Pub. No.: WO2021/078398
PCT Pub. Date: Apr. 29, 2021

(65) Prior Publication Data
US 2022/0394745 A1    Dec. 8, 2022

(51) Int. Cl.
*H04W 4/00* (2018.01)
*H04L 5/00* (2006.01)
(Continued)

(52) U.S. Cl.
CPC .......... *H04W 72/23* (2023.01); *H04L 5/0053* (2013.01); *H04W 74/0808* (2013.01)

(58) Field of Classification Search
CPC ... H04W 72/23; H04W 74/0808; H04W 8/24; H04L 5/0091; H04L 1/0026
See application file for complete search history.

(56) References Cited

U.S. PATENT DOCUMENTS 11,147,073 B2 * 10/2021 Liou .................... H04L 5/0092
2019/0297637 A1 * 9/2019 Liou ................ H04W 72/1273
(Continued)

OTHER PUBLICATIONS

International Search Report and Written Opinion for International Application No. PCT/EP2019/079268, mailed Sep. 1, 2020, 25 pages.
(Continued)

*Primary Examiner* — Abdelnabi O Musa
(74) *Attorney, Agent, or Firm* — Brake Hughes Bellermann LLP

(57) ABSTRACT

According to an aspect, there is provided a terminal device configured to perform the following. Initially, the terminal device monitors physical downlink control channel, PDCCH, transmissions according to a first set of rules. The first set of rules comprises rules for performing monitoring over at least two beam pair links, each beam pair link corresponding to a control resource set, CORESET, with a different active transmission configuration indication, TCI, state. The terminal device receives, using a first CORESET with a first active TCI state from an access node, an indication for limiting monitoring and consequently limits monitoring of PDCCH transmissions associated with CORESETs having a TCI state other than the first active TCI state for a period of time.

16 Claims, 5 Drawing Sheets

(51) Int. Cl.
*H04W 72/23* (2023.01)
*H04W 74/0808* (2024.01)

(56) References Cited

U.S. PATENT DOCUMENTS

| | | | | |
|---|---|---|---|---|
| 2020/0145983 A1* | 5/2020 | Levitsky | ................ | H04L 5/005 |
| 2020/0288479 A1* | 9/2020 | Xi | ................ | H04W 72/046 |
| 2020/0351682 A1* | 11/2020 | Cirik | ................ | H04W 76/28 |
| 2021/0037529 A1* | 2/2021 | Park | ................ | H04L 5/0053 |
| 2021/0084590 A1* | 3/2021 | Nam | ................ | H04W 52/0216 |
| 2021/0385802 A1* | 12/2021 | Bae | ................ | H04W 72/23 |
| 2022/0046541 A1* | 2/2022 | Wu | ................ | H04L 5/0048 |
| 2022/0287071 A1* | 9/2022 | Seo | ................ | H04L 5/0094 |
| 2022/0417775 A1* | 12/2022 | Cirik | ................ | H04B 7/0695 |
| 2024/0089984 A1* | 3/2024 | Li | ................ | H04B 7/06952 |

OTHER PUBLICATIONS

3GPP TSG RAN WG1 Meeting #96bis, R1-1904036; "Enhancements on Multi-TRP and Multi-Panel Transmission"; Source: OPPO; Agenda Item: 7.2.8.2; Xi'an, China; Apr. 8-12, 2019; 10 pages.

3GPP TSG RAN WG1 Meeting #98, R1-1908501; "Enhancements on Multi-TRP/Panel Transmission"; Source: Samsung; Agenda Item: 7.2.8.2; Prague, CZ; Aug. 26-30, 2019; 17 pages.

3GPP TSG RAN WG1 Meeting #97, R1-1906005; "PDCCH-Based Power Saving Signal/Channel"; Source: Huawei, HiSilicon; Agenda Item: 7.2.9.1; Reno, Nevada, USA; May 13-17, 2019; 10 pages.

3GPP TSG RAN WG1 Meeting #92bis, R1-1803751; "Remaining Issues on PDCCH Search Space"; Source: CATT; Agenda: 7.1.3.1.2; Sanya, China; Apr. 16-20, 2018; 8 pages.

\* cited by examiner

PDCCH MONITORING IN UNLICENSED SPECTRUM FOR A TERMINAL DEVICE WITH A SINGLE ACTIVE PANEL

CROSS-REFERENCE TO RELATED APPLICATIONS

This application is a national stage entry of International Application No. PCT/EP2019/079268, filed Oct. 25, 2019, entitled "PDCCH MONITORING IN UNLICENSED SPECTRUM FOR A TERMINAL DEVICE WITH A SINGLE ACTIVE PANEL" which is hereby incorporated by reference in its entirety.

TECHNICAL FIELD

The various example embodiments relate to relates to communications.

BACKGROUND

The fifth generation cellular systems (5G) aim to improve the throughput by a huge factor (even up to 1000 or more), which provides a multitude of challenges, especially considering the scarcity of spectrum at low frequency bands and the need for supporting a very diverse set of use cases. In order to reach this goal, it is important to exploit the higher frequencies such as millimeter wave frequencies in addition to the more conventional lower frequencies. However, the connection between an access node (e.g., a gNodeB, gNB) and a terminal device at millimeter waves is highly sensitive to any kind of blockages due to the use of narrow beams and poor penetration capability of signals with high (carrier) frequency. Multiple beam pair links may be configured and updated between the access node and the terminal device to adapt to the movement of the terminal device and/or changes in the radio environment (e.g., sudden blockage caused by a moving obstruction such as a truck) within a cell and thus to improve reliability of millimeter wave connections. When operating using unlicensed millimeter-wave bands (e.g., 60 GHz band), certain beam pair link(s) may be unavailable for communications at a given time due to interference detected by the spectrum sharing mechanism (such as listen-before-talk). For this reason, it is desirable to provide beam diversity to mitigate temporal unavailability of the certain beam pair link (either due to sudden blockage due to movement, or channel access blockage due to spectrum sharing mechanism).

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

According to a first aspect, there is provided a terminal device comprising means for performing: monitoring physical downlink control channel, PDCCH, transmissions according to a first set of rules, wherein the first set of rules comprises rules for performing monitoring over at least two beam pair links, each beam pair link corresponding to a control resource set, CORESET, with a different active transmission configuration indication, TCI, state; receiving, using a first CORESET with a first active TCI state from an access node, an indication for limiting monitoring; and limiting, in response to the receiving of the indication, monitoring of PDCCH transmissions associated with CORESETs having an active TCI state other than the first active TCI state for a period of time.

According to an example of the first aspect, the indication for limiting monitoring is received as a unicast transmission or as a broadcast transmission.

According to an example of the first aspect, the indication for limiting monitoring is received in a unicast or group-common PDCCH message or in a demodulation reference signal, DMRS, sequence or shift.

According to an example of the first aspect, the means are further configured to perform: detecting a PDCCH transmission from a first beam pair link corresponding to the first CORESET with the first active TCI state, wherein the detecting indicates a start of a channel occupancy time, COT.

According to an example of the first aspect, the detecting of the PDCCH transmission from the first beam pair link corresponds to detecting at least one of: a unicast PDCCH transmission; a wideband demodulation reference signal, WB DMRS, denoting the start of the COT; a wake up signal; and a group-common PDCCH transmission.

According to an example of the first aspect, the period of time is defined as one of: a pre-defined end of the COT; an end of the COT defined in the detected PDCCH transmission; an end of the COT defined in the indication for limiting monitoring; a pre-defined end of a downlink portion of the COT; an end of a downlink portion of the COT defined in the detected PDCCH transmission; an end of a downlink portion of the COT defined in the indication for limiting monitoring; a pre-defined number of slots; a pre-defined number of symbols; a number of slots indicated in the detected PDCCH transmission; a number of slots indicated in the indication for limiting monitoring; a number of symbols indicated in the detected PDCCH transmission; and a number of symbols indicated in the indication for limiting monitoring.

According to an example of the first aspect, the period of time is defined as at least one of: a period expiring at a beginning of the next monitoring occasion of a search space associated with the first CORESET with the first active TCI state, a period expiring when a timer expires, wherein the timer counts down by slots or symbols from an initial pre-defined value and is started and subsequently reset upon a reception of downlink control information, DCI, of the first active TCI state in the terminal device and a period expiring when a second indication for limiting monitoring of PDCCH transmissions associated with CORESETs having an active TCI state other than the second active TCI state for a second period of time is received in the terminal device.

According to a second aspect, there is provided a terminal device comprising means for performing: monitoring physical downlink control channel, PDCCH, transmissions according to a first set of rules, wherein the first set of rules comprises rules for performing monitoring over at least two beam pair links, each beam pair link corresponding to a control resource set, CORESET, with a different active transmission configuration indication, TCI state; detecting a PDCCH transmission from a first beam pair link corresponding to a first CORESET with a first active TCI state, wherein the detecting indicates a start of a COT; and limiting, in response to the detecting, monitoring of PDCCH transmissions associated with CORESETs having an active TCI state other than the first active TCI state for a period of time.

According to an example of the second aspect, the means are further configured to perform to perform the limiting of the monitoring of PDCCH transmissions associated with CORESETs having an active TCI state other than the first active TCI state for the period of time based on a configuration of the terminal device, the configuration being derived using a Radio Resource Control, RRC, protocol and/or based on contents of a unicast or group-common PDCCH transmission received by the terminal device as said PDCCH transmission.

According to an example of the second aspect, the detecting of the PDCCH transmission from the first beam pair link corresponds to detecting at least one of: a unicast PDCCH transmission; a wideband demodulation reference signal, WB DMRS, denoting the start of the COT; a wake up signal; and a group-common PDCCH transmission.

According to an example of the second aspect, the period of time is defined as one of: a pre-defined end of the COT; an end of the COT defined in the detected PDCCH transmission; a pre-defined end of a downlink portion of the COT; an end of a downlink portion of the COT defined in the detected PDCCH transmission; a pre-defined number of slots; a pre-defined number of symbols; a number of slots defined in the detected PDCCH transmission; a number of symbols defined in the detected PDCCH transmission; a period expiring at a beginning of the next monitoring occasion of a search space associated with the first CORESET with the first active TCI state; and a period expiring when a timer expires, wherein the timer counts down by slots or symbols from an initial pre-defined value and is started and subsequently reset upon a reception of downlink control information, DCI, of the first active TCI state in the terminal device.

According to an example of the second aspect, the limiting of the monitoring of the PDCCH transmissions associated with the CORESETs having an active TCI state other than the first active TCI state for the period of time comprises suspending the monitoring of the PDCCH transmissions associated with the CORESETs having an active TCI state other than the first active TCI state for the period of time.

According to an example of the second aspect, the limiting of the monitoring of the PDCCH transmissions associated with the CORESETs having an active TCI state other than the first active TCI state for the period of time comprises suspending the monitoring of the PDCCH transmissions associated with a CORESET having an active TCI state with the lowest common search space, CSS, index for the period of time.

According to an example of the second aspect, the means are further configured to perform before the monitoring: in response to receiving a first configuration message comprising at least two search space configurations associated with at least two CORESETs and with at least two different configured and/or active TCI states comprising at least the first active TCI state, configuring the terminal device to perform the monitoring based on said at least two search space configurations.

According to an example of the first or second aspect, the provided terminal device is configured to operate in one or more unlicensed millimeter-wave bands.

According to an example of the first or second aspect, the provided terminal device is a single-panel terminal device configured with multiple active beam pair links but being capable of serving only one beam pair link at a time.

According to an example of the first or second aspect, the means comprised in the provided terminal device comprise at least one processor; and at least one memory including computer program code; the at least one memory and the computer program code configured to, with the at least one processor, cause the performance of the terminal device.

According to a third aspect, there is provided an access node comprising means for performing: transmitting, using a first control resource set, CORESET, with a first active transmission configuration indication, TCI state, to a terminal device, an indication for limiting monitoring of physical downlink control channel, PDCCH, transmissions associated with CORESETs having an active TCI state other than the first active TCI state for a period of time.

According to an example of the third aspect, the means are further configured to perform, before the transmitting of the indication: causing configuring the terminal device to monitor PDCCH transmissions according to a first set of rules by transmitting a first configuration message to the terminal device, wherein the first configuration message comprises at least two search space configurations associated with at least two CORESETs and with at least two different configured and/or active TCI states comprising at least the first active TCI state for monitoring PDCCH transmissions.

According to an example of the third aspect, the means are further configured to perform: transmitting, before the transmitting of the indication for limiting monitoring, at least one message using a first CORESET with a first active TCI state to the terminal device.

According to an example of the third aspect, the means are further configured to perform: including, in the indication, information on the period of time, wherein the information on the period of time comprises information defining the period of time as at least one of a number of slots, a number of symbols, a pre-defined end of a channel occupancy time, COT, and a pre-defined end of a downlink portion of the COT or an indication bit having a pre-defined value for triggering a use of a pre-defined period of time for monitoring of PDCCH transmissions in the terminal device.

According to an example of the third aspect, the means are further configured to perform, before the transmitting of the indication: selecting a period of time configuration for the terminal device dynamically from a pre-defined set of one or more period of time configurations, wherein each period of time configuration in said pre-defined set defines the period of time as at least one of: a period expiring at an end of a COT, a period expiring at an end of a downlink portion of a COT, a pre-defined number of slots, a pre-defined number of symbols, a number of slots indicated in the indication for limiting monitoring, a number of symbols indicated in the indication for limiting monitoring, a period expiring at a beginning of the next monitoring occasion of a search space associated with a first CORESET with the first active TCI state, a period expiring when a timer expires, wherein the timer counts down by slots or symbols from an initial pre-defined value and is started and subsequently reset upon a reception of downlink control information, DCI, of the first active TCI state in the terminal device and a period expiring when a second indication for limiting monitoring of PDCCH transmissions associated with CORESETs having an active TCI state other than the second active TCI state for a second period of time is received in the terminal device; and causing configuring the terminal device to use the selected period of time configuration by transmitting a second configuration message comprising the selected period of time configuration to the terminal device.

According to an example of the third aspect, the pre-defined set comprises two or more period of time configurations and the selecting of the period of time configuration for the terminal device is based on channel conditions, channel availability and/or a load in a network of the access node.

According to an example of the third aspect, the means comprised in the provided access node comprise at least one processor; and at least one memory including computer program code; the at least one memory and the computer program code configured to, with the at least one processor, cause the performance of the terminal device.

According to a fourth aspect, there is provided a method comprising: monitoring physical downlink control channel, PDCCH, transmissions according to a first set of rules, wherein the first set of rules comprises rules for performing monitoring over at least two beam pair links, each beam pair link corresponding to a control resource set, CORESET, with a different active transmission configuration indication, TCI, state; receiving, using a first CORESET with a first active TCI state from an access node, an indication for limiting monitoring; and limiting, in response to the receiving of the indication, monitoring of PDCCH transmissions associated with CORESETs having an active TCI state other than the first active TCI state for a period of time.

According to a fifth aspect, there is provided a method comprising: monitoring physical downlink control channel, PDCCH, transmissions according to a first set of rules, wherein the first set of rules comprises rules for performing monitoring over at least two beam pair links, each beam pair link corresponding to a control resource set, CORESET, with a different active transmission configuration indication, TCI, state; detecting a PDCCH transmission from a first beam pair link corresponding to a first CORESET with a first active TCI state, wherein the detecting indicates a start of a COT; and limiting, in response to the detecting, monitoring of PDCCH transmissions associated with CORESETs having an active TCI state other than the first active TCI state for a period of time.

According to a sixth aspect, there is provided a method comprising: transmitting, using a first control resource set, CORESET, with a first active transmission configuration indication, TCI, state, to a terminal device, an indication for limiting monitoring of physical downlink control channel, PDCCH, transmissions associated with CORESETs having an active TCI state other than the first active TCI state for a period of time.

According to a seventh aspect, there is provided a computer program comprising instructions stored thereon for performing at least the following: monitoring physical downlink control channel, PDCCH, transmissions according to a first set of rules, wherein the first set of rules comprises rules for performing monitoring over at least two beam pair links, each beam pair link corresponding to a control resource set, CORESET, with a different active transmission configuration indication, TCI, state; receiving, using a first CORESET with a first active TCI state from an access node, an indication for limiting monitoring; and limiting, in response to the receiving of the indication, monitoring of PDCCH transmissions associated with CORESETs having an active TCI state other than the first active TCI state for a period of time.

According to an eighth aspect, there is provided a computer program comprising instructions stored thereon for performing at least the following: monitoring physical downlink control channel, PDCCH, transmissions according to a first set of rules, wherein the first set of rules comprises rules for performing monitoring over at least two beam pair links, each beam pair link corresponding to a control resource set, CORESET, with a different active transmission configuration indication, TCI, state; detecting a PDCCH transmission from a first beam pair link corresponding to a first CORESET with a first active TCI state, wherein the detecting indicates a start of a channel occupancy time, COT; and limiting, in response to the detecting, monitoring of PDCCH transmissions associated with CORESETs having an active TCI state other than the first active TCI state for a period of time.

According to a ninth aspect, there is provided a computer program comprising instructions stored thereon for performing at least the following: transmitting, using a first control resource set, CORESET, with a first active transmission configuration indication, TCI, state, to a terminal device, an indication for limiting monitoring of PDCCH transmissions associated with CORESETs having an active TCI state other than the first active TCI state for a period of time.

According to an tenth aspect, there is provided an electromagnetic signal using a first configuration resource set, CORESET, associated with a first active transmission configuration indication, TCI, state, and carrying computer-readable data comprising an indication indicating whether or not to limit monitoring of physical downlink control channel, PDCCH, transmissions associated with CORESETs having an active TCI state other than the first active TCI state for a period of time.

BRIEF DESCRIPTION OF DRAWINGS

In the following, exemplary embodiments will be described with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
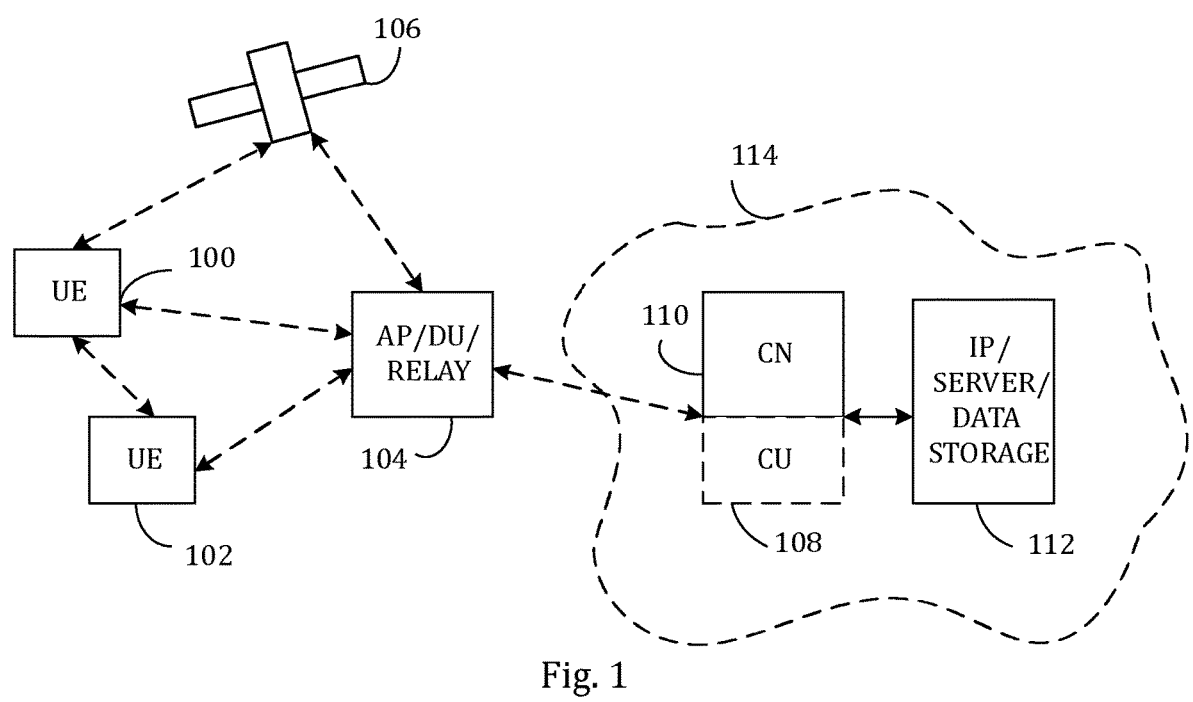
FIG. 1 illustrates a wireless communication scenario to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. As an example of the relay station, the gNB functionalities may be carried out by DU part of the IAB (integrated access and backhaul) node. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a so-called IAB node, where UE functionalities are carried out by MT (Mobile Termination) part of the IAB node. The MT part may be called also as IAB-UE.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micros controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT (Radio Access Technology) operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of access nodes such as (e/g)NodeBs, the user device may have an access to a plurality of radio cells and the system may comprise also other apparatuses, such as relay (or IAB) nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

At least some of the embodiments to be discussed may specifically be targeting operation in unlicensed spectrum at millimeter waves. Operation in unlicensed spectrum is regulated by certain channel access rules with the goal of enabling fair spectrum use among different RATs/networks or even among different (access) nodes of the same network on the same shared unlicensed spectrum. The rules may require, e.g., the use of listen-before-talk (LBT)-type channel access and/or the use of other channel sensing mechanisms such as detect-and-avoid (DAA) mechanism. Specifically in beam-based operation, said LBT operation may be performed on the intended transmit direction, i.e., the transmitter may perform channel sensing using the beam it intends to use for the scheduled or planned transmission. In fact, a device with analog beamforming is not, by definition, capable of performing omnidirectional LBT. Thus, in the following scenarios of interest it is assumed that LBT or other channel sensing is performed per beam and that there exists also an LBT or channel sensing process per beam.

One of the parameters used for limiting channel access in unlicensed spectrum relevant for the embodiments is Channel Occupancy Time (COT) which defines a time interval when the device occupies the channel. Typically, the COT is initiated by the LBT procedure. The maximum duration of the COT may vary depending on the scenario and configuration.

At least some of the embodiments may be targeting specifically the 60 GHz band which is an unlicensed band in most countries. The 60 GHz band may be understood, in the context of this application, as a frequency band comprising 60 GHz (or at least one frequencies in close vicinity of 60 GHz). Specifically, the 60 GHz band may be defined to correspond to a 60 GHz band as defined in any country of the world (or European Union). For example, the 60 GHz band may correspond to any of 57-71 GHz, 57-66 GHz, 57-64 GHz, 57.1-63.9 GHz and 59.4-62.9 GHz.

Other unlicensed millimeter-wave bands (i.e., bands other than the 60 GHz band) may be targeted in other embodiments. Said other unlicensed millimeter-wave bands may comprise current or future unlicensed millimeter-wave bands. For example, said other unlicensed millimeter-wave bands may comprise FR2 band (24-52.6 GHz as defined in current NR) and/or a future extension to 52.6-114 GHz (to be covered in R17/18).

One suggested feature of the future 5G communications systems is the so-called 5G New Radio. 5G New Radio refers to a new global 5G standard for an orthogonal frequency-division multiplexing (OFDM)-based air interface designed to fit the more stringent requirements of the 5G systems (for example, providing different types of services to a huge number of different types of devices operating over a wide frequency spectrum). The 5G New Radio shall be able to allow network deployment with minimized manual efforts and as automated self-configuration as possible.

New Radio (or specifically Release-15 of New Radio) defines four different QCL (quasi co-location) types, between two reference signals (RS) or a reference signal and a channel (including physical data and control channels). Quasi co-location may be defined so that two antenna ports are said to be quasi co-located if some properties of the channel over which a symbol on one antenna port is conveyed can be inferred from the channel over which a symbol on the other antenna port is conveyed. An antenna port is, here, a logical concept defined such that the channel over which a symbol on the antenna port is conveyed can be inferred from the channel over which another symbol on the same antenna port is conveyed. Each antenna port corresponds to a specific (characteristic) channel (i.e., symbols transmitted over a given antenna port are subject to the same propagation conditions) and is associated with its own reference signal. There is one resource grid per antenna port.

In other words, each transmitted reference signal is subject to specific (characteristic) propagation conditions between a transmitter and a receiver and reference signals that are sharing the same or similar propagation conditions are considered quasi collocated. Each reference signal may have (or be associated with) a source reference signal. However, for example, SSB (Synchronization Signal Block referring more specifically to a Synchronization/Physical Broadcast Channel block) does not have a source reference signal.

The QCL types are defined as shown in the table below.

| QCL Type | QCL parameter set |
|---|---|
| QCL-TypeA | Doppler shift, Doppler spread, average delay, delay spread |
| QCL-TypeB | Doppler shift, Doppler spread |
| QCL-TypeC | average delay, Doppler shift |
| QCL-TypeD | spatial Rx parameter (e.g., spatial correlation in Rx) |

To give an example, a PDCCH from an access node and a SSB are quasi collocated if it is determined that they both encounter similar channel conditions (or properties). Said channel conditions correspond to the QCL parameter sets as defined on the table above. When two reference signals or channels are of the same QCL-TypeD, it is assumed that the same analog beam-pair is utilized for both reception and transmission.

A Transmission Configuration Indicator (TCI) states are state configurations within the higher layer parameter PDSCHConfig. Each TCI-State contains parameters for configuring a quasi co-location relationship between one or two downlink reference signals and the DMRS ports of the PDSCH, the DMRS port of PDCCH or the CSI-RS port(s) of a CSI-RS resource. TCI States are dynamically sent over in a DCI (Downlink Control Information) message which includes configurations such as QCL-relationships between the DL RSs in one CSI-RS (Channel State Information Reference Signal) set and the PDSCH DMRS (Physical Downlink Shared CHannel DeModulation Reference Signal) ports. A terminal device may be configured with a list of up to M TCI-States to decode a PDSCH according to a detected Physical Downlink Control CHannel (PDCCH) with DCI intended for the terminal device and a given serving cell. Here, M is an integer which depends on the terminal device capability (maxNumberActiveTCI-PerBWP). The embodiments to be discussed below may specifically employ single-panel terminal devices. A single-panel terminal device is a terminal device comprising a single antenna panel (i.e., a single, typically flat antenna array) which in turn comprises a plurality of antenna elements. Consequently, a single-panel terminal device is capable of transmitting and receiving, respectively, via only said one antenna panel (or specifically via an analog beam provided by said antenna panel in QCL-TypeD) at a given time and/or have only one baseband and thus need to decide a panel/beam from which to receive or transmit on. In at least some of the embodiments to be discussed below (e.g., ones employing 60 GHz band), it may be assumed that a terminal device is not capable of digital beamforming (i.e., not being able to use more than one beam at a given time). Moreover, it may be assumed that (single-panel) terminal devices according to embodiments (or at least some of them) are capable of handling only one active TCI state at a given time.

In the embodiments to be discussed below, each terminal device may be configured with one or more CORESETs (COntrol REsource SETs). A CORESET may be defined as a set of physical resources (i.e., a specific area on NR Downlink Resource Grid) and a set of parameters that is used to carry the PDCCH and DCI. Specifically, a CORESET may be defined as a resource allocation unit made up of resource element groups (REGs) in frequency domain and 1 or 2 or 3 OFDM symbols in time domain. Each REG may be made of a resource block (RB) comprising 12 resource elements (RE). Each of said one or more CORESETs may comprise a single TCI state or multiple TCI states. Only one TCI state is active at a given time for a given CORESET. An access node may switch the active TCI state of the terminal device by a transmitting MAC-CE (Medium Access Control-Control Element) command to the terminal device.

To deal with limitations of single-panel terminal devices, New Radio (Release 15) defines the following procedure for licensed bands. A terminal de-vice, initially, follows the latest active TCI state activated for the latest downlink CORESET. In response to two CORESETs with different active TCI states becoming overlapped in time, the terminal device (capable of one active state) selects the TCI state of the CORESET with the lowest CSS (Common Search Space) index of the cell with the lowest serving cell ID.

Connection between an access node and a terminal device is sensitive to any kind of blockages at millimeter wave frequencies due to use of narrow beams and poor penetration capability of a signal at high carrier frequencies. Multiple beam pair links may be configured and updated between an access node and a terminal device to adapt to the movement of the terminal device within a cell. A beam pair link may be defined as a pair comprising a transmit beam at the access node and receive beam at the terminal device in downlink and as a pair comprising a transmit beam at the terminal device and a receive beam at the access node in uplink.

Furthermore, when operating at 60 GHz scenario, certain beam pair link(s) may be unavailable for communications based on interference detected by the spectrum sharing mechanism (such as to LBT). For these reasons, it is desirable to provide beam diversity to mitigate temporal unavailability of the certain beam pair link (either due to sudden blockage due to movement, or channel access blockage due to spectrum sharing mechanism).

In the case of unlicensed operation (especially at the 60 GHz band) and single-panel terminal devices, the aforementioned licensed TCI state operational behavior is not ideal when multiple CORESETs with different TCI states are configured in the terminal device for beam diversity purpose. A terminal device which had previously detected a first COT with a first active TCI state would still need to monitor for CORESETs with a second active TCI state during said first COT according to the behavior described above. However, this is clearly inefficient operation in this case, because during the monitoring for the CORESETs with the second active TCI state, a terminal device cannot be served in the ongoing first COT applying the first active TCI state. Further, if multiple CORESETs with different active TCI states would be overlapping, a terminal device would even need to drop monitoring for a CORESET with the first (active) TCI state corresponding to the first COT if the CORESET with the second active TCI state had a higher CSS index. This type of behavior is clearly not desirable. Finally, during the first COT, a multi-panel access node may acquire a second COT for the second active TCI state, which may correspond to a better beam for the terminal device, the access node may want to switch the terminal device to the second COT of the second active TCI state.

FIG. 2A illustrates a process according to embodiments for performing PDCCH monitoring in an efficient manner. The illustrated process may be performed by a terminal device or more specifically either of the terminal devices 100, 102 of FIG. 1. Specifically, said terminal device may be a single-panel terminal device, that is, the terminal device may be configured with multiple active beam pair links, but it may be capable of serving only one beam pair link at a time. The terminal device may be configured to operate at millimeter wave frequencies. Moreover, said terminal device may be configured to operate using unlicensed spectrum (e.g., at a 60 GHz band) though in other embodiments licensed spectrum may also be used.

Referring to FIG. 2A, the terminal device monitors, in block 201, PDCCH transmissions according to a first set of rules. Specifically, the first set of rules comprises rules for performing monitoring over at least two beam pair links. Each beam pair link corresponds to a CORESET with a different active TCI state. In other words, the terminal device is assumed to be configured to employ at least two beam pair links corresponding to at least two CORESETS with different TCI states (or specifically with different active TCI states). Each CORESET may have multiple TCI states configured, but only one of them may be active at a given time for a given CORESET. The first set of rules may also comprise predefined search space priorities.

The terminal device receives, in block 202, using a first CORESET with a first active TCI state (via a wireless communications link) from an access node, an indication for limiting monitoring. Said first CORESET with the first active TCI state is associated with one of said at least two beam pair links. For example, the indication may be received, in block 202, in the content of the unicast or group-common PDCCH or content carried by the DMRS sequence or shifts. Further details regarding the reception of the indication for limiting monitoring is provided in relation to further embodiments.

In response to the receiving of the indication in block 202, the terminal device limits, in block 203, monitoring of PDCCH transmissions associated with CORESETs having a TCI state other than the first active TCI state for a period of time. In other words, the terminal device monitors in a normal manner only PDCCH transmissions associated with the first active TCI state during said period of time. The period of time may be a pre-defined period of time or a period of time determined dynamically by the terminal device, possibly based on information received in the indication for limiting monitoring. The limiting of the monitoring in block 203 may comprise, specifically, suspending the monitoring of the PDCCH transmissions associated with the CORESETs having an active TCI state other than the first active TCI state for said period of time. In other embodiments, other limiting behavior may be, additionally or alternatively, applied. For example, the limiting in block 203 may comprise suspending the monitoring of the PDCCH transmissions associated with a CORESET having an active TCI state with the lowest CSS index.

For example, if the terminal device is configured to perform monitoring over first, second and third beam pair links corresponding to first, second and third CORESETs with first, second and third active TCI states, respectively, the terminal device may limit or suspend monitoring of PDCCH transmissions related to the second and third beam pair link corresponding to the second and third CORESETs with the second and third active TCI states while continuing the monitoring of PDCCH transmissions related to the first beam pair link corresponding to the first CORESET with the first active TCI state without change. After said period of time has passed, the terminal device continues the monitoring of PDCCH transmissions from each of said at least two beam pair links (as indicated by the arrow connection block 203, to block 201).

FIG. 2B illustrates a process according to embodiments for performing signaling to a terminal device so as to enable or trigger the terminal device to perform PDCCH monitoring in an efficient manner. The illustrated process may be performed by an access node (e.g., a gNB or an eNB) or more specifically by the access node 104 of FIG. 1. The access node may be configured to operate at millimeter wave frequencies. Moreover, said access node may be configured to operate using unlicensed spectrum (e.g., at a 60 GHz band) though in other embodiments licensed spectrum may also be used. The process of FIG. 2B carried out by the access node may corresponds to the process of FIG. 2A carried out by a terminal device, that is, said processes may be carried out in parallel by said two entities.

It is assumed, in FIG. 2B, that a terminal device connected to the access node via a wireless communication link is, initially, configured to monitor PDCCH transmissions according to a first set of rules. Similar to as defined in relation to FIG. 2A, the first set of rules comprises rules for performing monitoring over at least two beam pair links, each beam pair link corresponding to a CORESET with a different (active) TCI state. The configuring of the terminal device may have been carried out previously by the access node performing the process of FIG. 2B or some other access node (or other network node) by wirelessly transmitting a configuration message to the terminal device (see FIG. 3) or by the terminal device itself.

The access node transmits, in block 211, using a first CORESET with a first active TCI state, an indication for limiting monitoring to the terminal device. Specifically, the indication in block 211 may be for limiting (or suspending) monitoring of PDCCH transmissions associated with CORESETs having an active TCI state other than the first active TCI state for a period of time. The transmission in block 211 may be a broadcast or a unicast transmission. Specifically, the indication may be transmitted, in block 211, in the content of the unicast or group-common PDCCH or content carried by the DMRS sequence or shifts.

In some embodiments, the access node may include, in the indication transmitted in block 211, information on said period of time. The access node (as opposed to the terminal device itself) may define the period of time (i.e., the duration of the period of time and/or the beginning of the period of time and/or the end of the period of time) in said information on the period of time. The period of time may be, for example, indicated as a number of slots or symbols. Alternatively, the period of time may be indicated as a pre-defined end of a COT (i.e., a pre-defined end of channel occupancy) and a pre-defined end of a downlink portion of the COT (i.e., a pre-defined end of channel occupancy for downlink).

In other embodiments, the information on said period of time may comprise a flag or an indication bit indicating to the terminal device whether or not to use a certain pre-defined period of time configuration (e.g., defining the period of time as an end of the COT, as an end of a downlink portion of the COT or as a pre-defined number of slots or symbols) in limiting the PDCCH monitoring. In such embodiments, the terminal device may be preconfigured with said pre-defined period of time configuration (e.g., as will be discussed in relation to FIG. 3). Said flag or indication bit may act simultaneously also as an indicator on whether or not to limit the monitoring of PDCCH transmissions. Alternatively, different values of said flag or indication bit may correspond to different periods of time (pre-configured to the terminal device). This latter option of using a simple flag or indication bit has the advantage of low signalling overhead. Further options for the definition of the period of time (or the period of time configuration) according to embodiments is provided in relation to FIG. 3 (specifically, in relation to block 304).

Figure 2:
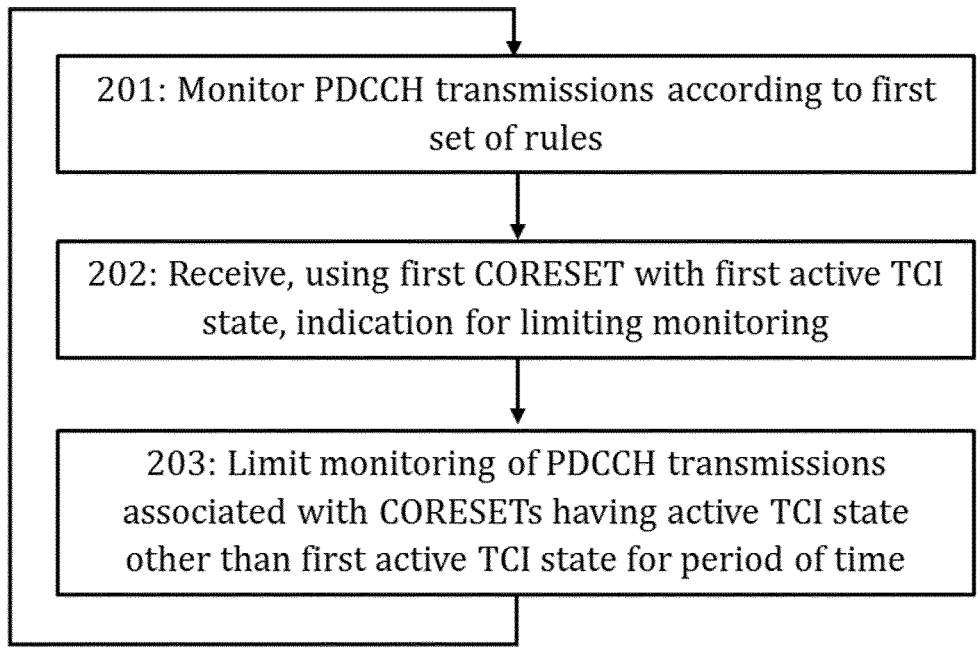
FIGS. 2A, 2B and 3 illustrate processes according to embodiments.
Figure 3:
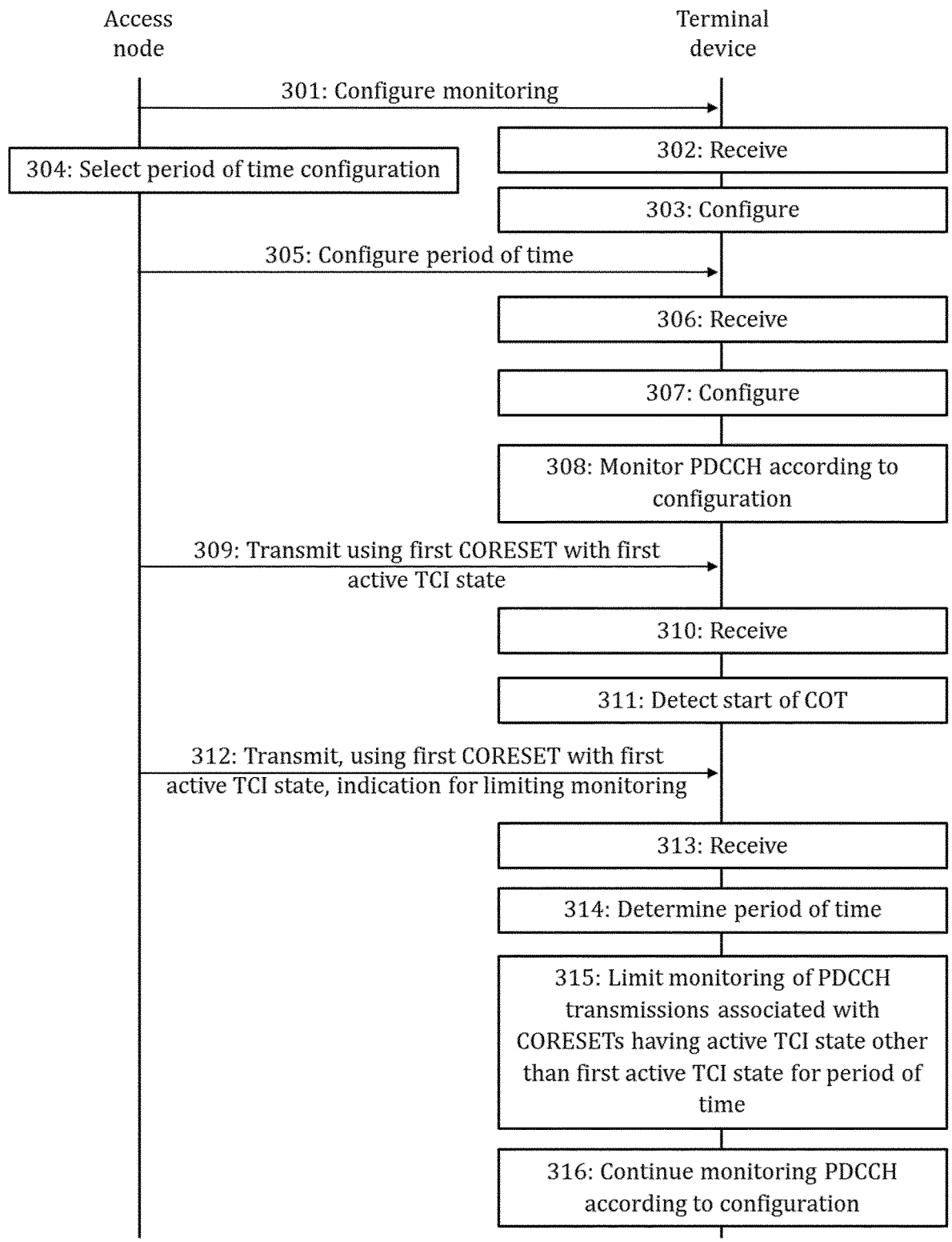

FIG. 3 illustrates signaling between an access node and a terminal device according to embodiments for performing PDCCH monitoring in the terminal device in an efficient manner. The illustrated processes corresponds for the most part to FIGS. 2A and 2B. Thus, the definitions for the terminal device and access node provided in relation to FIGS. 2A and 2B (unless otherwise stated).

In contrast to FIGS. 2A and 2B, FIG. 3 illustrates (in elements 301 to 305) also the processes of configuring the terminal device for normal monitoring operation (i.e., non-suspended operation) and for suspended monitoring operation.

First, the access node causes, in elements 301, 302, 303, configuring a terminal device to monitor PDCCH transmissions according to a first set of rules. As defined also in relation to FIG. 2, the first set of rules comprises rules for performing monitoring over at least two beam pair links, each beam pair link corresponding to a CORESET with a different active TCI state. Specifically, the causing configuring may comprise transmitting, by the access node in message 301, a first configuration message to the terminal device, receiving, in the terminal device in block 302, the first configuration message and configuring, in block 303, the terminal device according to the first configuration message. The first configuration message (i.e., message 301) may comprise at least two search space configurations associated with at least two CORESETs and at least two different active (and/or configured) TCI states (comprising a first active TCI state and one or more other TCI states). The first configuration message may be transmitted using RRC (Radio Resource Control) signaling. Each search space configuration defines at least one search space. Therefore, in response to receiving the first configuration message in block 302, the terminal device configures, in block 303, itself to perform the PDCCH monitoring based on said at least two search space configurations.

It is assumed here that PDCCH monitoring occasions for at least two search spaces (defined in said at least two search spaces, respectively) associated with CORESETs with different active TCI states overlap at least partially in time. It is further assumed that the terminal device is capable of performing PDCCH monitoring at a given time only based on search spaces associated with CORESETs having the same active TCI state.

Second, the access node causes, in elements 304, 305, 306, 307, configuring a terminal device to employ a particular period of time or period of time configuration in limiting the monitoring of the PDCCH transmissions. The access node selects, in block 304, a period of time configuration for the terminal device dynamically from a pre-defined set of one or more period of time configurations. Each period of time configuration in said pre-defined set may define the period of time as a pre-defined period of time or as a period expiring in response to certain criteria being met (i.e., a period duration of which depends, e.g., on network behavior). Specifically, each period of time configuration in said pre-defined set may define the period of time as at least one of:
 a period expiring at an end of the COT (i.e., at an end of the channel occupancy),
 a period expiring at an end of a downlink portion of the COT,
 a pre-defined number of slots,
 a pre-defined number of symbols,
 a number of slots to be indicated separately in an indication for limiting monitoring or in another PDCCH message,
 a number of symbols to be indicated separately in an indication for limiting monitoring or in another PDCCH message,
 a period expiring at a beginning of the next monitoring occasion of a search space associated with a first CORESET with the first active TCI state,
 a period expiring when a timer expires, wherein the timer counts down by slots or symbols (from an initial pre-defined value) and is started and subsequently reset upon a reception of DCI of the first active TCI state in the terminal device and
 a period expiring when a second indication for limiting monitoring of PDCCH transmissions associated with CORESETs having an active TCI state other than the second active TCI state for a second period of time is received in the terminal device.

In some embodiments, said pre-defined set of one or more period of time configurations may comprise multiple configurations corresponding to different pre-defined number of slots and/or multiple configurations corresponding to different pre-defined number of symbols. While said pre-defined set of one or more period of time configurations may consists, in some cases, of only a single period of time configuration, providing multiple options (i.e., a pre-defined set of two or more period of time configuration) provides the additional benefit of enabling the access node to optimize performance based on channel conditions, channel availability and/or a load in a network of the access node.

In some embodiments, a period of time configuration may comprise a pre-defined period of time and one or more periods expiring in response to certain criteria being met (e.g., one or more of any of such options listed above).

After the selecting in block 304, the access node transmits, in message 305, a second configuration message to the terminal device. The second configuration message comprises at least the selected period of time configuration. In response to receiving, in block 306, the second configuration message, the terminal device configures, in block 307, itself according to the selected period of time configuration.

While above it was assumed that the access node selects a single period of time configuration and configures the terminal device to use said single period of time configuration, in some other embodiments, the access node may select two or more period of time configurations defining multiple periods of time (in element 304) and configure the terminal device to use said two or more period of time configurations (in elements 305 to 307). In such embodiments, the terminal device may be able to select the period of time dynamically, for example, based on a received indication for limiting monitoring and information comprised therein (as will be discussed below).

In some embodiments, only one or none of the configurations defined in elements 301 to 303 and elements 304 to 307 may be carried out. In some other embodiments, both of the configurations defined in elements 301 to 303 and elements 304 to 307 may be carried out but in a different order or in parallel with each other. In some embodiments, the terminal device may be configured according to any of the configurations described above by another network node (e.g., by another access node).

After the terminal device has been configured in elements 301 to 307, the terminal device monitors, in block 308, PDCCH transmissions according to the first set of rules, where the first set of rules comprises rules for performing monitoring over at least two beam pair links and based on said at least two search space configurations. Said at least two beam pair links and said at least two search space configurations are associated with at least two CORESETs and at least two different active TCI states. The monitoring in block 308 may, specifically, comprise searching for a COT start or for a COT presence based on each of said at least two search space configurations.

The access node transmits, in message 309, at least one message to the terminal device using a first CORESET with a first active TCI state. Said at least one message serves (in view of the illustrated process) to indicate to the terminal device that a PDCCH transmission (i.e., any PDCCH transmission) using a first CORESET with the first active TCI state has commenced. In some embodiments, said at least one message (i.e., message 309) may comprise information on one or more of a start of the COT (i.e., a start of the channel occupancy), an end of the COT (i.e., an end of the channel occupancy), a structure of the COT and a presence of the COT. Said at least one message may be, for example, at least one of unicast PDCCH transmission (or a unicast downlink control information, DCI), a wideband demodulation reference signal (WB DMRS) denoting the start of the COT, a wake up signal and a group-common PDCCH transmission. The transmission in message 309 may be a unicast or broadcast transmission.

When the access node transmits message 309, the terminal device is monitoring PDCCH according to block 308. Consequently, the terminal device receives, in block 310, the at least one message transmitted from the access node based on a search space associated with the first CORESET with the first active TCI state. In other words, the terminal device detects, in block 310, a PDCCH transmission from a first beam pair link corresponding to the first CORESET with the first active TCI state. Based on the receiving (or detecting) in block 310, the terminal device determines, in block 311, that a COT (and thus transmission) has started according to one or more search space(s) associated with CORESET(s) with the first active TCI state. In other words, the receiving in block 310, detects, in block 311, a start of the COT (based on the receiving of the message 309 in block 310).

Subsequently, the access node transmits, in message 312, an indication for limiting monitoring to the terminal device using the first CORESET with the first active TCI state, similar to as described in relation to FIG. 2B. As described in detail in relation to FIG. 2B, the indication in message 312 may comprise information on a period of time (e.g., an indication bit or information on a number of slots or symbols) to be used in limiting the monitoring of PDCCH transmissions. In some embodiments, messages 309, 312 may correspond to a single message. In some embodiments, the information on the period of time may comprise information on one or more of the start of the COT, the end of the COT, the end of a downlink portion of the COT, the structure of the COT and a presence of the COT. Any of the listed options may be given, e.g., in slots.

The terminal device receives, in block 313, the indication for limiting monitoring (and optionally other control data) from the access node based on a search space associated with the first CORESET with the first active TCI state. Based on the received indication, the terminal device is able to determine PDCCH monitoring behavior for said at least two search space configurations associated with CORESET(s) with the other active TCI states for a period of time. Specifically, the terminal device, first, determines, in block 314, a period of time during which the PDCCH monitoring is to be limited. The determining in block 314 may be based on the period of time configuration or configurations of the terminal device (configured in elements 304, 305, 306, 307) and optionally the indication for limiting monitoring.

The determining in block 314 may be carried out in multiple different ways depending, for example, on period of time configuration of the terminal device (e.g., as configured by the access node in elements 304, 305, 306, 307) and what information is received (or expected to be received) in block 313.

In some embodiments, the terminal device may be configured to only use a single period of time which is defined as at least one of an end of the COT (defined in message 305 as a part of the period of time configuration or later in message 309 or 312), an end of a downlink portion of the COT (defined in message 305 as a part of the period of time configuration or later in message 309 or 312), a pre-defined number of slots or symbols and a number of slots or symbols defined in the indication for limiting monitoring (i.e., in message 309) or in the detected PDCCH transmission (i.e., in message 312). In such embodiments, the determining in block 314 comprises simply selecting said one period of time.

As described in relation to FIG. 2B, a flag or an indication bit (a value of which indicates whether or not certain pre-defined period of time is to be used in limiting PDCCH monitoring) may be comprised in the indication for limiting monitoring. Said flag or indication bit may be employed in the determining of the period of time in block 314. In other words, if an indication with an indication bit having a value '1' is received in block 313, the terminal device may select a predefined period of time (which may have been configured in elements 304 to 307 or before that). On the one hand, if an indication with an indication bit having a value '0' is received in block 313, the terminal device may, depending on the embodiment, continue monitoring of PDCCH transmission without any change (i.e., limiting or suspending of PDCCH monitoring is not triggered) or select a second pre-defined period of time (e.g., configured in elements 304 to 307) for use in limiting or suspending of PDCCH monitoring.

As described above, the terminal device may, in some embodiments, be configured to employ a plurality of periods of time defined in a plurality of period of time configurations. In such embodiments, the determining in block 314 may comprise selecting a period of time from a plurality of periods of time defined in said plurality of period of time configurations, for example, based on information comprised in the indication for limiting monitoring. The indication for limiting monitoring may explicitly indicate which period of time to use or it may comprise information based on which the period of time may be determined (in block 314).

After the period of time has been determined in block 314, the terminal device limits or suspends, in block 315, monitoring of PDCCH transmissions associated with CORESETs having an active TCI state other than the first active TCI state for said period of time, similar to as described in relation block 203 of FIG. 2. After the period of time has passed, the terminal device continues, in block 316, normal monitoring of PDCCH transmission according to its configuration (i.e., continues the monitoring started in block 308).

In some embodiments, blocks 312, 313 of FIG. 3 may be omitted. In such embodiments, the receiving of the indication for limiting monitoring may be implicit in the sense that the period of time following the detection (or detection time instance) in block 310 and the corresponding PDCCH monitoring behavior (i.e., blocks 311, 314, 315) at the terminal device may be determined, in response to the detecting in block 310, based on a configuration of the terminal device. Specifically, said configuration of the terminal device may be fixed or (pre-)determined in the specifications, configured via higher layers (i.e., using a RRC protocol), derived based on contents (or specifically contents other than the indication for limiting monitoring) of unicast or group-common PDCCH transmission received by the terminal device from the access node or determined according any combination of the means listed above.

According to one such (simplistic) embodiment, the terminal device performs the following. First, the terminal device monitors, according to block 308, PDCCH transmissions according to a first set of rules. The first set of rules comprises rules for performing monitoring over at least two beam pair links, each beam pair link corresponding to a CORESET with a different active TCI state. The terminal device detects, according to block 310, a PDCCH transmission (i.e., message 309) from a first beam pair link corresponding to a first CORESET with a first active TCI state, where the detecting indicates (or defines) a start of a COT (i.e., a start of the channel occupancy), according to block 311). Specifically, by receiving the PDCCH transmission corresponding to the first CORESET with the first active TCI state, the terminal device detects that the COT associated with the first CORESET and the first active TCI state has started. Finally, the terminal device limits, according to block 315, in response to the detecting, monitoring of PDCCH transmissions associated with CORESETs having an active TCI state other than the first active TCI state for a period of time.

Figure 4:
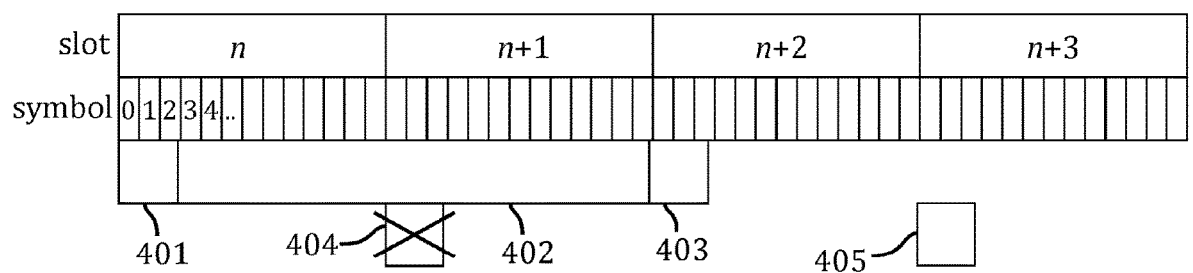
FIG. 4 illustrates exemplary PDCCH monitoring operation according to an embodiment.

FIG. 4 illustrates an exemplary monitoring operation according to an embodiment. Specifically, the illustrated example corresponds to the case where the terminal device is configured so that the period of time for suspending PDCCH transmissions is defined to expire upon an end of a COT. In the illustrated example, a terminal device detects a start or presence of the COT and receives a Group Common (GC)-PDCCH transmission in a first CORESET 401 with a first active TCI state in the beginning of slot n. Here, the received GC-PDCCH content is assumed to include the following indications:
  a slot where the COT ends (i.e., slot n+2 in this example) and
  an indication for liming monitoring defining that a terminal device shall suspend monitoring in CORESETs with other active TCI state(s) until the end of the COT.
After the start of the COT, the terminal device buffers symbols according to the first active TCI state of the first CORESET. The elements 402, 403 correspond, respectively, to PDSCH and the first CORESET (carrying no DCI).

As the indication for limiting monitoring indicates to suspend active TCI states other than the first active TCI state, the terminal device does not monitor a second CORESET active with a second active TCI state and its corresponding associated search spaces at slot n+1, as is indicated by element 404. Instead, the terminal device waits until the end of the slot n+2, i.e., the end of the slot in which the COT ends, and only then detects the second CORESET with the second active TCI state in element 405. The end of the COT may be communicated to the terminal device after the end of the slot n+2.

It should be noted that the embodiments discussed above are specifically targeting the scenario where PDCCH monitoring occasions for two (or more) search spaces associated with CORESETs with different active TCI states overlap, at least partially. If there is no such overlap, the terminal device follows or buffers the active TCI state of the latest CORESET following conventional NR functionalities.

The blocks, related functions, and information exchanges described above by means of FIGS. 2A, 2B, 3 and 4 are in no absolute chronological order, and some of them may be performed simultaneously or in an order differing from the given one. In some embodiments, some of the steps may be neglected, for example, if the relevant information is already available (e.g., stored to a memory).

Figure 5:
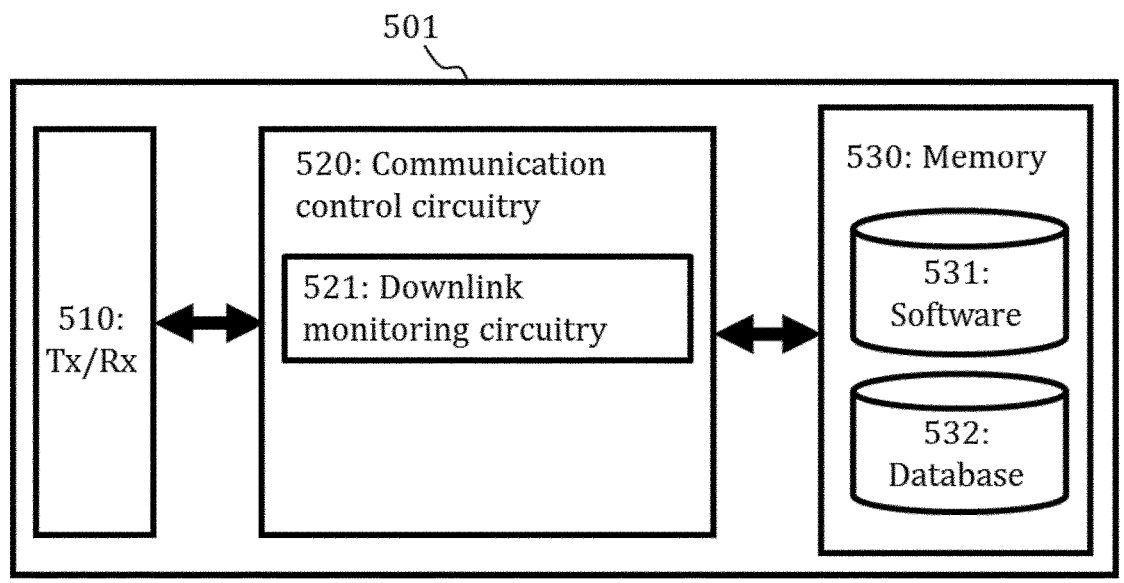
FIGS. 5 and 6 illustrate apparatuses according to embodiments.

FIG. 5 illustrates an apparatus 501 configured to carry out the functions described above in connection with a terminal device. The apparatus may, for example, correspond to any of the terminal devices 100, 102 of FIG. 1. The apparatus may be an electronic device comprising electronic circuitries. The apparatus may be a separate network entity or a plurality of separate entities. The apparatus may comprise a communication control circuitry 520, such as at least one processor, and at least one memory 530 including a computer program code (software) 531 wherein the at least one memory and the computer program code (software) are configured, with the at least one processor, to cause the apparatus to carry out any one of the embodiments of the terminal device described above.

The memory 530 may comprise a database 532 which may comprise information on, for example, one or more configurations for the monitoring of PDCCH transmissions and/or for the period(s) of time to be used in limiting monitoring. The memory 530 may also comprise other databases which may not be related to the described PDCCH monitoring functionalities configuration functionalities according to embodiments.

Referring to FIG. 5, the communication control circuitry 520 may comprise downlink monitoring circuitry 521. The downlink monitoring circuitry 521 may be configured, for example, to carry out at any of the processes of FIG. 2A and/or any of the processes performed by the terminal device in FIG. 3.

Figure 6:
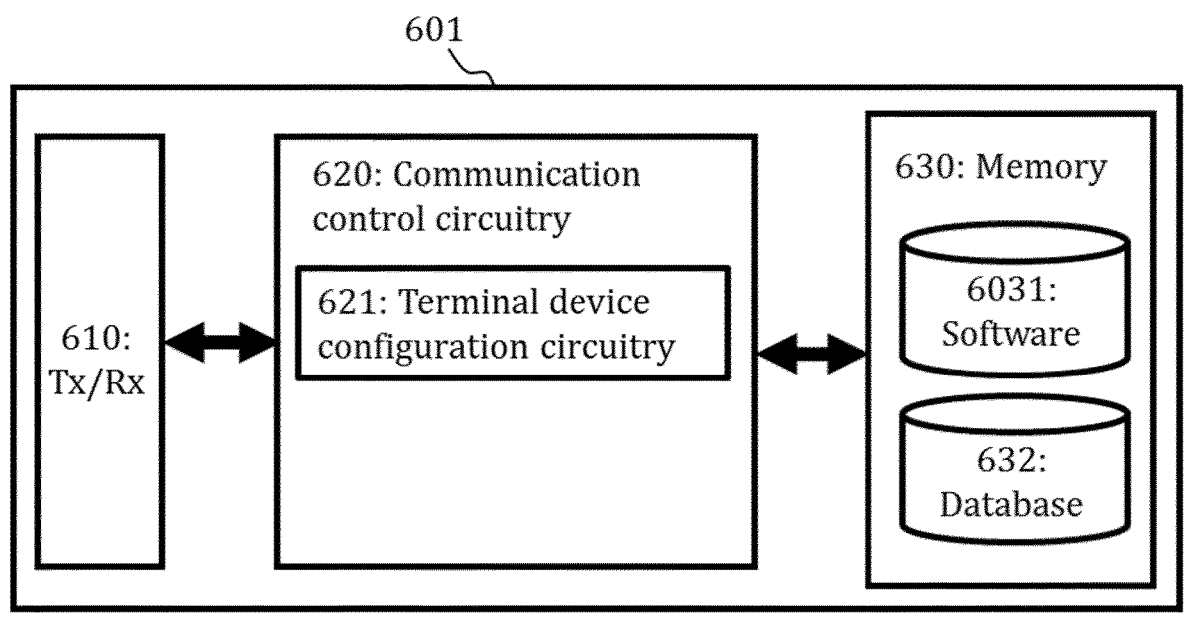

FIG. 6 illustrates an apparatus 601 configured to carry out the functions described above in connection with an access node. The apparatus may, for example, correspond to the access node 104 of FIG. 1. The apparatus may specifically be a gNB or eNB. The apparatus may be an electronic device comprising electronic circuitries. The apparatus may be a separate network entity or a plurality of separate entities. The apparatus may comprise a communication control circuitry 620 such as at least one processor, and at least one memory 630 including a computer program code (software) 631 wherein the at least one memory and the computer program code (software) are configured, with the at least one processor, to cause the apparatus to carry out any one of the embodiments of the access node described above.

The memory 630 may comprise a database 632 which may comprise, for example, information on one or more configurations for used or to be used by a terminal device for performing (downlink) monitoring and/or one or more configurations for period(s) of time (i.e., period of time configurations) used or to be used by a terminal device for limiting or suspending (downlink) monitoring, as described in previous embodiments. The memory 630 may also comprise other databases which may not be related to the functionalities of the access node according to any of presented embodiments such as any databases used by relay or donor nodes in conventional operation.

Referring to FIG. 6, the communication control circuitry 620 may comprise terminal device configuration circuitry 621 configured to configure terminal devices to perform downlink monitoring according to any of presented embodiments. The terminal device configuration circuitry 621 may be configured to carry out at least some of actions relating to FIG. 2B and/or to elements blocks 301, 304, 305, 309, 312 of FIG. 3.

The apparatuses 501, 601 described in relation to FIGS. 5 and 6 may further comprise communication interfaces (Tx/Rx) 510, 610 comprising hardware and/or software for realizing communication connectivity according to one or more communication protocols. The communication interface may provide the apparatus with communication capabilities to communicate in the cellular communication system and enable communication, for example, with network nodes and terminal devices. Specifically, the communication interfaces 510 of FIG. 5 may enable communication with one or more access nodes and the communication interfaces 610 of FIG. 6 may enable communication with one or more terminal devices and one or more core network elements. The communication interface 510, 610 may comprise standard well-known components such as an amplifier, filter, frequency-converter, (de)modulator, and encoder/decoder circuitries and one or more antennas. The communication interfaces 510, 610 may comprise radio interface components providing the apparatus with radio communication capability in the cell.

The communications interfaces 510 of the apparatus 501 may specifically comprise a single antenna panel (i.e., a single, typically flat antenna array) which in turn comprises a plurality of antenna elements. Said single antenna panel (i.e., a single, typically flat antenna array) as well as the apparatus 501 as a whole may be configured to operate using unlicensed spectrum (e.g., using the 60 GHz band and/or the FR1 band).

The memories of the apparatuses described in relation to FIGS. 5 and 6 may be implemented using any suitable data storage technology, such as semiconductor based memory devices, flash memory, magnetic memory devices and systems, optical memory devices and systems, fixed memory and removable memory.

As used in this application, the term "circuitry may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 2A, 2B, 3 and 4 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2A, 2B, 3 and 4 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FP- GAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described above may also be carried out in the form of a computer process defined by a computer program or portions thereof. Embodiments of the methods described in connection with FIGS. 2A, 2B, 3 and 4 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

According to an embodiment, there is provided an electromagnetic signal using a first CORESET associated with a first active TCI state and carrying computer-readable data comprising an indication indicating whether or not to limit monitoring of PDCCH transmissions associated with CORESETs having an active TCI state other than the first active TCI state for a period of time. Said electromagnetic signal may correspond to transmission in block 211 and/or to message 312 of FIG. 3. The limiting of the monitoring of PDCCH transmissions and/or the period of time may be defined as described in relation to any of the previous embodiments. Moreover, the indication may be the indication for limiting monitoring as defined in any of the embodiments described above. The indication may be, for example, an indication bit and/or information on a number of slots or symbols defining said period of time.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A terminal device comprising:
at least one processor; and
at least one memory including computer program code;
the at least one memory and the computer program code configured to, with the at least one processor, cause the terminal device at least to:
monitor physical downlink control channel, PDCCH, transmissions according to a first set of rules, wherein the first set of rules comprises rules for performing monitoring over at least two beam pair links, each beam pair link corresponding to a control resource set, CORESET, with a different active transmission configuration indication, TCI, state;
detect a PDCCH transmission from a first beam pair link corresponding to a first CORESET with a first active TCI state, wherein the detecting indicates a start of a channel occupancy time, COT;
receive, using the first CORESET with the first active TCI state from an access node, an indication for limiting monitoring; and
limit, in response to the receiving of the indication, monitoring of PDCCH transmissions associated with CORESETs having an active TCI state other than the first active TCI state for a period of time.

2. The terminal device according to claim 1, wherein the indication for limiting monitoring is received as a unicast transmission or as a broadcast transmission.

3. The terminal device according to claim 1, wherein the indication for limiting monitoring is received in a unicast or group-common PDCCH message or in a demodulation reference signal, DMRS, sequence or shift.

4. The terminal device according to claim 1, wherein the at least one processor and the computer program code configured to cause the apparatus to detect the PDCCH transmission from the first beam pair link comprises the at least one processor and the computer program code configured to cause the apparatus to detect at least one of:
a unicast PDCCH transmission;
a wideband demodulation reference signal, WB DMRS, denoting the start of the COT;
a wake up signal; and
a group-common PDCCH transmission.

5. The terminal device according to claim 1, wherein the period of time is defined as one of:
a pre-defined end of the COT;
an end of the COT defined in the detected PDCCH transmission;
an end of the COT defined in the indication for limiting monitoring;
a pre-defined end of a downlink portion of the COT;
an end of a downlink portion of the COT defined in the detected PDCCH transmission;
an end of a downlink portion of the COT defined in the indication for limiting monitoring;
a pre-defined number of slots;
a pre-defined number of symbols;
a number of slots indicated in the detected PDCCH transmission;
a number of slots indicated in the indication for limiting monitoring;
a number of symbols indicated in the detected PDCCH transmission; and
a number of symbols indicated in the indication for limiting monitoring.

6. The terminal device according to claim 1, wherein the period of time is defined as at least one of:
- a period expiring at a beginning of the next monitoring occasion of a search space associated with the first CORESET with the first active TCI state;
- a period expiring when a timer expires, wherein the timer counts down by slots or symbols from an initial pre-defined value and is started and subsequently reset upon a reception of downlink control information, DCI, of the first active TCI state in the terminal device; and
- a period expiring when a second indication for limiting monitoring of PDCCH transmissions associated with CORESETs having an active TCI state other than the second active TCI state for a second period of time is received in the terminal device.

7. An access node comprising:
- at least one processor; and
- at least one memory including computer program code;
- the at least one memory and the computer program code configured to, with the at least one processor, cause the access node at least to:
- cause configuring a terminal device to monitor physical downlink control channel, PDCCH, transmissions according to a first set of rules by transmitting a first configuration message to the terminal device, wherein the first configuration message comprises at least two search space configurations associated with at least two control resource sets, CORESETs, and with at least two different configured and/or active transmission configuration indication, TCI, states comprising at least a first active TCI state for monitoring PDCCH transmissions; and
- transmit, using a first CORESET with the first active TCI state, to the terminal device, an indication for limiting monitoring of physical downlink control channel, PDCCH, transmissions associated with CORESETs having an active TCI state other than the first active TCI state for a period of time.

8. The access node of claim 7, wherein the at least one memory and the computer program code are configured to, with the at least one processor, further cause the access node to:
- transmit, before the transmitting of the indication for limiting monitoring, at least one message using a first CORESET with a first active TCI state to the terminal device.

9. The access node according to claim 7, wherein the at least one memory and the computer program code are configured to, with the at least one processor, further cause the access node to:
- include, in the indication, information on the period of time, wherein the information on the period of time comprises information defining the period of time as at least one of a number of slots, a number of symbols, a pre-defined end of a channel occupancy time, COT, and a pre-defined end of a down-link portion of the COT or an indication bit having a pre-defined value for triggering a use of a pre-defined period of time for monitoring of PDCCH transmissions in the terminal device.

10. The access node according to claim 7, wherein the at least one memory and the computer program code are configured to, with the at least one processor, further cause the access node to perform, before the transmitting of the indication:
- select a period of time configuration for the terminal device dynamically from a pre-defined set of one or more period of time configurations, wherein each period of time configuration in said pre-defined set defines the period of time as at least one of:
- a period expiring at an end of a COT,
- a period expiring at an end of a downlink portion of a COT,
- a pre-defined number of slots,
- a pre-defined number of symbols,
- a number of slots indicated in the indication for limiting monitoring,
- a number of symbols indicated in the indication for limiting monitoring,
- a period expiring at a beginning of the next monitoring occasion of a search space associated with a first CORESET with the first active TCI state,
- a period expiring when a timer expires, wherein the timer counts down by slots or symbols from an initial pre-defined value and is started and subsequently reset upon a reception of downlink control information, DCI, of the first active TCI state in the terminal device and
- a period expiring when a second indication for limiting monitoring of PDCCH transmissions associated with CORESETs having an active TCI state other than the second active TCI state for a second period of time is received in the terminal device; and
- cause configuring the terminal device to use the selected period of time configuration by transmitting a second configuration message comprising the selected period of time configuration to the terminal device.

11. The access node according to claim 10, wherein the pre-defined set comprises two or more period of time configurations and the selecting of the period of time configuration for the terminal device is based on channel conditions, channel availability and/or a load in a network of the access node.

12. A method comprising:
- monitoring physical downlink control channel, PDCCH, transmissions according to a first set of rules, wherein the first set of rules comprises rules for performing monitoring over at least two beam pair links, each beam pair link corresponding to a control resource set, CORESET, with a different active transmission configuration indication, TCI, state;
- detecting a PDCCH transmission from a first beam pair link corresponding to a first CORESET with a first active TCI state, wherein the detecting indicates a start of a channel occupancy time, COT;
- receiving, using the first CORESET with the first active TCI state from an access node, an indication for limiting monitoring; and
- limiting, in response to the receiving of the indication, monitoring of PDCCH transmissions associated with CORESETs having an active TCI state other than the first active TCI state for a period of time.

13. The method according to claim 12, wherein the indication for limiting monitoring is received as a unicast transmission or as a broadcast transmission.

14. The method according to claim 12, wherein the indication for limiting monitoring is received in a unicast or group-common PDCCH message or in a demodulation reference signal, DMRS, sequence or shift.

15. The method according to claim 12 comprising:
performing before the receiving of the indication for limiting monitoring:
- detecting a PDCCH transmission from a first beam pair link corresponding to the first CORESET with the first active TCI state, wherein the detecting indicates a start of a channel occupancy time, COT.

16. A method comprising:
cause configuring a terminal device to monitor physical downlink control channel, PDCCH, transmissions according to a first set of rules by transmitting a first configuration message to the terminal device, wherein the first configuration message comprises at least two search space configurations associated with at least two control resource sets, CORESETs, and with at least two different configured and/or active transmission configuration indication, TCI, states comprising at least a first active TCI state for monitoring PDCCH transmissions; and
transmitting, using a first CORESET with the first active TCI state, to the terminal device, an indication for limiting monitoring of physical downlink control channel, PDCCH, transmissions associated with CORESETs having an active TCI state other than the first active TCI state for a period of time.

* * * * *